Figure 1:
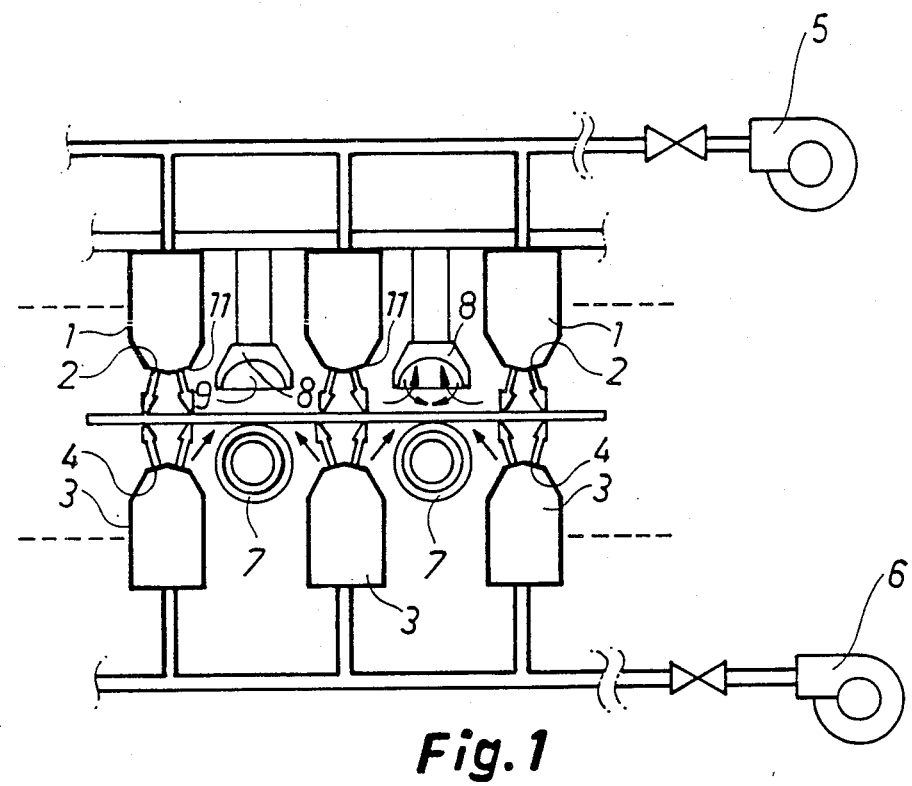

United States Patent [19]

Reunamäki

[11] Patent Number: 4,767,439
[45] Date of Patent: Aug. 30, 1988

[54] FLOW BARRIER IN THE ANNEALING SECTION OF A GLASS TEMPERING APPARATUS

[75] Inventor: Pauli Reunamäki, Tampere, Finland

[73] Assignee: O/Y Kyro A/B Tamglass, Tampere, Finland

[21] Appl. No.: 113,473

[22] Filed: Oct. 28, 1987

[30] Foreign Application Priority Data

Oct. 29, 1986 [FI] Finland ................................. 864394

[51] Int. Cl.[4] .............................................. C03B 27/04
[52] U.S. Cl. ........................................ 65/351; 65/118; 65/119; 65/348
[58] Field of Search ................... 65/119, 120, 348, 351

[56] References Cited

U.S. PATENT DOCUMENTS

| | | | |
|---|---|---|---|
| 1,841,060 | 1/1932 | Russell | 65/118 |
| 1,955,163 | 4/1934 | Adams | 65/119 |
| 3,223,498 | 12/1965 | Davidson, Jr. | 65/119 X |
| 4,236,909 | 12/1980 | Thomas et al. | 65/351 X |

Primary Examiner—Arthur Kellogg
Attorney, Agent, or Firm—Burns, Doane, Swecker & Mathis

[57] ABSTRACT

The invention relates to a flow barrier in the annealing section of a glass tempering apparatus, said annealing section being provided with glass sheet supporting rollers (7) and cooling air blow boxes (1, 3) are disposed above and below a glass sheet, in addition to which there are, above the glass sheets, "false rolls" (8) in the form of a downward open trough, extending crosswise to the traveling direction of said glass sheets. The purpose of "false rolls" (8) is to increase a pressure applied to the top surface of a glass sheet in order to reduce the risk of a glass sheet becoming afloat. A flow along the trough, which increases towards the ends of the trough, results in a non-uniform tempering. The flow is cut off by fitting the trough with partitions (9) spaced from each other.

7 Claims, 1 Drawing Sheet

FLOW BARRIER IN THE ANNEALING SECTION OF A GLASS TEMPERING APPARATUS

The present invention relates to a flow barrier in the annealing section of a glass tempering apparatus, said annealing section being provided with rollers for supporting a glass sheet and the cooling air blow boxes are positioned above and below a glass sheet and, furthermore, above a glass sheet are disposed false rolls in the shape of a downward-open trough extending crosswise relative to the traveling direction of glass sheets.

The glass sheet supporting rollers block the movement of cooling air and thus cause a decrease in underneath cooling effect. In order to compensate for that, it is necessary to increase the underneath blast pressure even to such a degree that there will be a danger of the glass sheet becoming afloat, i.e. a glass sheet may rise off the rollers and its movements and transport can no longer be controlled. In order to elimnate this drawback, above the glass sheet are provided so-called "false rolls", preferably in the form of downward-open trough for deflecting the blast air rising up from a glass sheet back towards the glass sheet so as to apply to the glass sheet a downward pressure effect.

The pressure prevailing between a "false roll" and a glass sheet generates a flow longitudinally of said "false roll", said flow increasing towards the ends of a "false roll". This results in more cooling effect at the fringes of a glass sheet leading to the non-uniform annealing of a glass sheet. This non-uniform annealing is particularly evident in that the breaking characteristics of a glass sheet are changed, so that the size of broken fragments in fringe areas will be even smaller than before compared to the size of pieces or fragments shattered in the centre.

According to the invention, this problem can be alleviated by providing the trough of a "false roll" with longitudinally spaced partitions for preventing air flow longitudinally of the trough.

Figure 2:
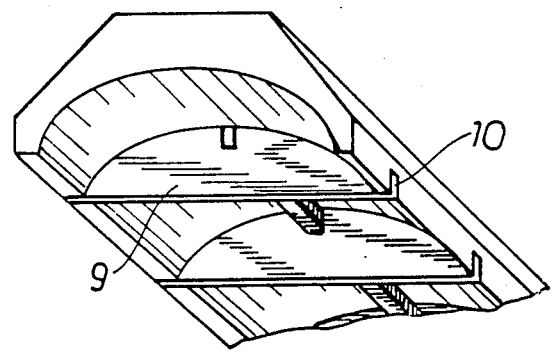

The invention will now be described in more detail with reference made to the accompanying drawings, in which FIG. 1 shows a part of the annealing section of a glass tempering apparatus schematically in side view and FIG. 2 shows a detail of a "false roll" in perspective view.

FIG. 1 shows a glass sheet supported by rollers 7 in the tempering and annealing section of a glass tempering apparatus. Above the glass sheet are cooling air blow boxes 1, connected by air ducts to a blower 5, and below are blow boxes 3, connected by air ducts to a blower 6. Such upper and lower blow boxes 1 and 3 can also be connected to a common blower, from which blast air is distributed by means of pressure control units.

Blow boxes 1 and 3 extend transversely to the traveling direction of a glass sheet, i.e. parallel to rollers 7. Blow boxes 1 and 3 are provided with orifices 2 and 4 in two parallel rows so that the cooling air jets are directed obliquely towards the surface of a glass sheet.

Rollers 7 prevent the circulation of cooling air on the bottom surface of a glass sheet and thus decrease the bottom surface cooling effect to such a degree that the increase of underneath blast pressure required for compensating this decreased cooling effect leads to the situation where thin glass sheets rise off said rollers 7. This undesired effect is further pronounced by the fact that blast air tends to force its way into the wedge-shaped spaces between the rollers and a glass sheet. The problem has been alleviated by arranging in alignment with rollers 7 above a glass sheet so-called "false rolls" 8, having a surface in the form of a downward-open trough. These "false rolls" 8 increase the pressure applied to the top surface of a glass sheet by deflecting the sir flows rising up from a glass sheet back towards the glass sheet.

However, the pressure prevailing between "false roll" 8 and a glass sheet results in an air flow along the trough of a "false roll". The flow rate increases towards the ends of a "false roll", resulting in a greater cooling effect on the fringes of a glass sheet. This leads to non-uniform tempering unless the longitudinal flow along the trough is stopped. According to the invention, the longitudinal flow along the trough is prevented or at least substantially restricted by means of partitions 9 fitted in the trough. Partitions 9 are spaced from each other lengthwise of the trough. This spacing can be up to 40 cm, but most preferably it is circa 10 cm.

Partitions 9 can be built as a structurally integral assembly, a sort of grate, which can be fitted in the trough as a single unit. Partitions 9 can also be individual plates. Fastening of partitions 9 can be effected in slots 10 made in the edges of said trough, the fastening lugs at the ends of plates 9 being embedded in said slots.

The distance between plates 9 can be constant or it may vary lengthwise of said "false roll" 8 e.g. in a way that said distance is shorter in the end zones than in the central area.

The design of partitions 9 can vary in many ways; they need not be flat, nor solid. Also the direction of such partitions can vary.

I claim:

1. A flow barrier in the annealing section of a glass tempering apparatus, said annealing section being provided with glass sheet supporting rollers (7) and cooling air blow boxes (1, 3) disposed above and below a glass sheet and, furthermore, above the glass sheets are mounted "false rolls" (8) in the form of a downward open trough, extending crosswise relative to the traveling direction of glass sheets, characterized in that said trough (8) is provided with longitudinally spaced partitions (9) for stopping the flow of cooling air longitudinally of the trough.

2. A flow barrier as set forth in claim 1, characterized in that said partitions (9) are formed by means of a separate grate fitted in the trough.

3. A flow barrier as set forth in claim 1, characterized in that said partitions (9) are fitted in slots (10) made in the edges of the trough.

4. A flow barrier as set forth in claim 1, characterized in that the distances between partitions (9) are up to 40 cm, most preferably circa 10 cm.

5. A flow barrier as set forth in claim 2, characterized in that said partitions are fitted in slots made in the edges of the trough.

6. A flow barrier as set forth in claim 2, characterized in that the distances between partitions are up to 40 cm, most preferably circa 10 cm.

7. A flow barrier as set forth in claim 3, characterized in that the distances between partitions are up to 40 cm, most preferably circa 10 cm.

* * * * *